May 15, 1951  H. H. MANCHESTER  2,552,801
SPARK PLUG CLEANER
Filed July 26, 1947
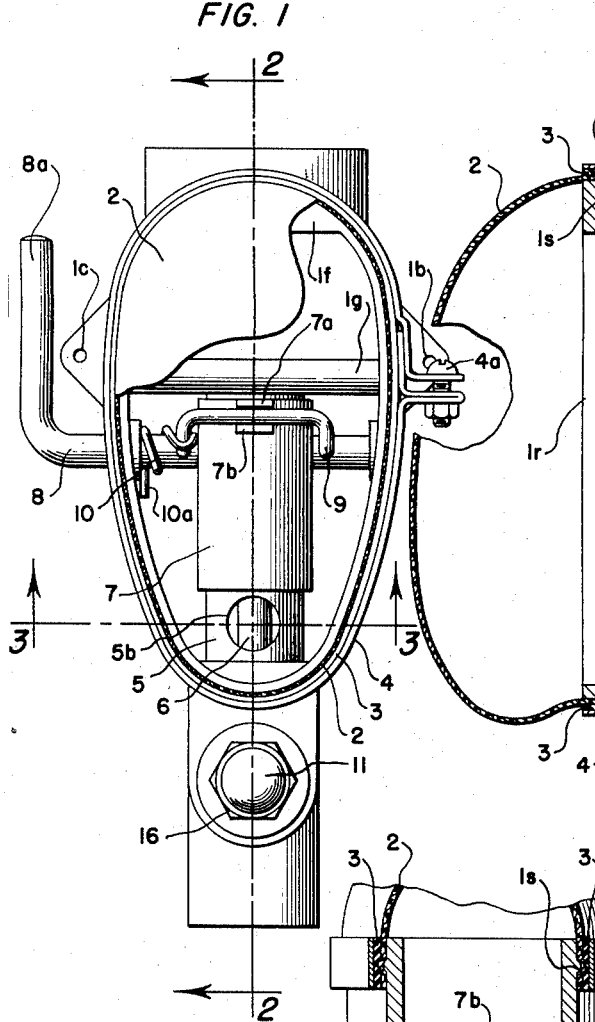
FIG. 1
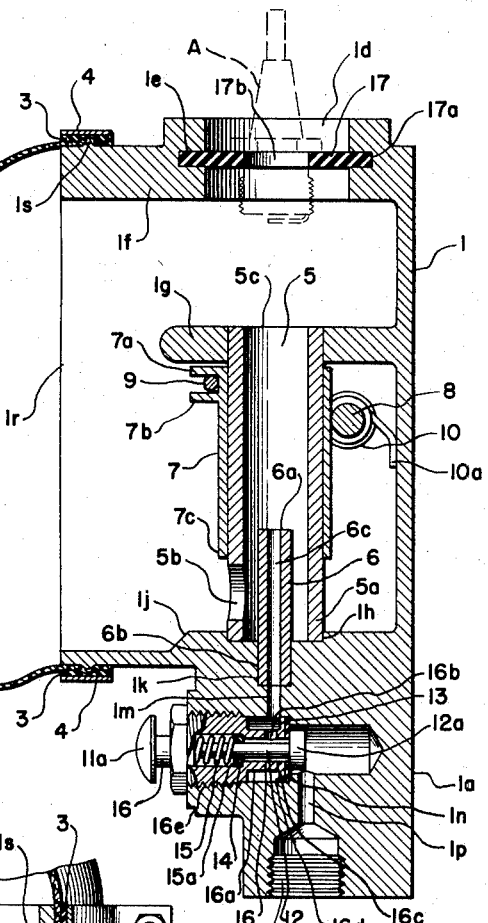
FIG. 2
FIG. 3
INVENTOR.
HENRY H. MANCHESTER
BY
*Wm. H. Dean*
AGENT Patented May 15, 1951

2,552,801

UNITED STATES PATENT OFFICE 2,552,801

SPARK PLUG CLEANER

Henry H. Manchester, San Diego, Calif.

Application July 26, 1947, Serial No. 763,931

6 Claims. (Cl. 51—8)

My invention relates to a spark plug cleaner, more particularly for use in cleaning carbon and corrosion from the interior and electrode portion of spark plugs, and the objects of my invention are:

First, to provide a spark plug cleaner of this class in which the simplicity of construction promotes replaceability of parts and greatly reduces the cost of maintenance thereof.

Second, to provide a spark plug cleaner of this class in which the abrasive material used is continually recirculated whereby bulk of the spark plug cleaner is maintained at a minimum since a small amount of abrasive is used in the cleaner which requires a small amount of space for storage thereof.

Third, to provide a spark plug cleaner of this class using a relatively small amount of abrasives in cleaning a large number of spark plugs whereby economy of operation of said spark plug cleaner is considerably worth while.

Fourth, to provide a spark plug cleaner of this class which very thoroughly and efficiently cleans spark plugs.

Fifth, to provide a spark plug cleaner of this class in which the violent circulation is accomplished intermediate the jet and a spark plug inserted therein for cleaning due to the return of the abrasive to the bag adjacent the plug being cleaned and the jet delivering the abrasive thereto.

Sixth, to provide a spark plug cleaner of this class in which a bag is provided adjacent the abrasive delivery jet and the spark plug being cleaned whereby the curvature of surface internally of said bag promotes rapid recirculation of the abrasive backwardly through said jet for continuous impingement on plugs being cleaned adjacent thereto.

Seventh, to provide a spark plug cleaner of this class in which a substantially curved bag in close proximity to the jet and the spark plug being cleaned provides an efficient vent and filter for air passing from the spark plug cleaner to the atmosphere.

Eighth, to provide a spark plug cleaner of this class in which a relatively small amount of abrasive is employed whereby a minimum of moisture is collected in said abrasive from airlines which permits air employed in said spark plug cleaner to rapidly dissipate the moisture from said small amount of abrasive, keeping said abrasive in useful condition when in operation.

Ninth, to provide a spark plug cleaner of this class in which a large abrasive entrance hole is provided adjacent the air jet in said spark plug cleaner whereby a greater volume circulation of air and abrasive in the cleaner proportionately increases the cleaning efficiency on spark plugs inserted in said spark plug cleaner.

Tenth, to provide a spark plug cleaner of this class in which a valve return spring pressing on a peripheral seal for the valve plunger maintains a constant and efficient seal around the plunger of said valve which extends to atmosphere.

Eleventh, to provide a spark plug cleaner of this class having a novel spark plug holding grommet which is economical to produce, very simply adapted to various sized plugs and which maintains a tenacious hold in the spark plug cleaner casing and around spark plugs inserted therethrough.

Twelfth, to provide a spark plug cleaner of this class in which a constant blast of air may be maintained against the spark plug inserted therein while the delivery of abrasive material is shut off permitting any collection of abrasive material around the electrode portions of a plug to be blown away before removing the spark plug from the spark plug cleaner, preventing the transfer of abrasive from the spark plug cleaner to the interior of an internal combustion engine in which said spark plug is operated, and Thirteenth, to provide a spark plug cleaner of this class which is very simple and economical of construction, efficient in operation, and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawing and to the characters of reference thereon forming a part of this application in which: Figure 1 is a front elevational view of my spark plug cleaner showing portions thereof broken away and in section to amplify the illustration; Figure 2 is a vertical sectional view taken from the line 2—2 of Figure 1 showing parts in elevation to facilitate the illustration, and Figure 3 is a fragmentary sectional view taken from the line 3—3 of Figure 1 showing portions further broken away and in section to amplify the illustration.

Similar characters of reference refer to similar parts and portions throughout the several views of the drawing.

The casing 1, bag 2, gasket 3, clamp band 4, tubes 5 and 6, sleeve valve 7, shaft 8, lever 9, spring 10, button 11, plunger 12, gaskets 13 and 14, spring 15, valve casing 16, and the grommet 17 constitute the principal parts and portions of my spark plug cleaner.

The casing 1 is provided with a substantially flat rear surface 1a adapted to be positioned on a wall or other suitable mounting as desired. Projecting adjacent this flat surface 1a at the rear of the casing 1 are lug portions 1b and 1c through which screws or bolts may be inserted for rigidly mounting the casing 1. In the normally upper end of the casing 1, I have provided a substantially round opening 1d having an enlarged diameter annular recess 1e therein in which the peripheral edge 17a of the grommet 17 is held. This grommet 17 is provided with a central opening 17b through which spark plugs may be inserted as indicated by dash lines A in Figure 2 of the drawing. Below the upper end 1f of the casing 1, and substantially parallel with the inner surface thereof, is a shelf 1g through which the tube 5 extends in axial alignment with the hole 1d in the upper end of the casing 1. The normally lower end 5a of the tube 5 is disposed in a conforming recess portion 1h in the bottom of the casing 1, and adjacent to the bottom 1j of the casing 1 the tube 5 is provided with a large opening 5b in the sidewall thereof. This opening 5b communicates with the external surface of the tube 6 below the delivery end 6a thereof, and this tube 6 is concentrically mounted in the tube 5 and directed toward the opening 1d in the upper end of the casing 1 in axial alignment therewith. The lower end 6b of the tube 6 is press fitted in a recess 1k in the casing 1 communicating with a reduced air inlet orifice 1m. This orifice 1m communicates with an annular groove 16a in the valve casing 16 through which an opening 16b extends into communicative relation with the plunger 12, reciprocally mounted in an enlarged bore portion 16c in the valve casing 16. Abutting the end of the valve casing 16 is a gasket 13 having a central opening therein substantially the size of the large bore portion 16c of the valve casing 16. This gasket 13 rests adjacent an enlarged flange portion 16d of the valve casing 16 which is adapted to hold said gasket 16 against a sealing shoulder 1n in the casing 1. It will be noted that the plunger 12 is provided with an enlarged head portion 12a substantially greater in diameter than the bore 16c in the valve casing 16 and the opening in the gasket 13, whereby compression of the spring 15 maintains a seal intermediate the orifice 16b in the valve casing 16, and the inlet orifice 1t of the casing 1 which communicates with an internally screw threaded fitting portion 1q, adapted to be connected with a conventional air line. The opposite end of the plunger 12 from the head portion 12a is externally screw threaded and the button 11 is screw threaded thereon and provided with a thumb piece 11a projecting outwardly of the valve casing 16 into atmosphere. The spring 15 engages the end of the button 11, and at its opposite end presses against a solid washer 15a engaging the compressible gasket 14 shouldered in the valve casing 16. This spring 15 serves the dual purpose of maintaining the head portion 12a of the plunger 12 in sealed relationship by the gasket 13 and compresses the gasket 14 around the plunger 12, maintaining a seal therearound and also maintaining a seal in connection with the shouldered portion of said gasket 14 internally of the valve casing 16, all as shown best in Figure 2 of the drawing. The front portion of the casing 1 is provided with an open portion 1r around which a projecting bead portion 1s is integral with the outer surface of the casing 1, which bead portion 1s is engaged by the open end portion of the bag 2 which surrounds the opening 1r for maintaining abrasive inwardly of the casing 1. Outwardly of the edge of the bag 2 is a compressible gasket 3 surrounded by the clamp band 4 having a bolt 4a extending through its opposite ends for tightening the same. The bag 2 is preferably made of tightly woven foraminous material such as canvas or the like which permits the passage of air therethrough and retains the abrasive inwardly of the casing 1. In the construction of my spark plug cleaner I have provided a sleeve valve means which is adapted to shut off the delivery of abrasive to spark plugs being cleaned so that a jet of clean air may be employed in removing the abrasive from the spark plug about the porcelain and electrodes thereof after the spark plug has been sand blasted. Referring particularly to Figure 2 of the drawing, it will be seen that the sleeve valve 7 is a hollow tubular member vertically reciprocally slidable over the outer side of the tube 5. This sleeve valve 7 is arranged to slide downwardly past the opening 5b in the tube 5 for shutting off the passage of sand from the bag 2 into the tube 5 and around the air jet tube 6. Near the upper end of the sleeve valve 7 I have provided spaced bearing portions 7a and 7b intermediate which the substantially U-shaped lever 9 is positioned. Opposite ends of this U-shaped lever 9 are fixed in the shaft 8 in straddling relationship with the sleeve valve 7 as shown best in Figure 1 of the drawing. Engaging this lever 9 is a spring 10 having an end portion 10a engaging the rear of the casing 1 at its inner side. Thus the spring 10 tends to maintain the valve 7 in its uppermost solid line position as shown in Figure 2 of the drawing wherein the opening 5b of the tube 5 is uncovered. The spring 10 is entwined about the shaft 8 which is journalled in opposite sides of the casing 1, as shown in Figure 1 of the drawings, and this shaft 8 is provided with an upwardly extending handle portion 8a at the outer side of the casing 1 for manual vertical reciprocal operation of the sleeve valve 7 around the outer side of the tube 5 for optionally closing the opening 5b therein.

The operation of my spark plug cleaner is substantially as follows: The internally screw threaded fitting portion 1q in connection with a conventional compressed air line provides compressed air through the orifice 1p communicating with the head 12a of the plunger 12. When it is desired to clean a spark plug, as indicated by dash lines A, said spark plug is inserted in said dash line position in the opening 17b of the grommet 17. The thumb piece 11a of the button 11 is pressed inwardly, relieving the head portion 12a of the plunger 12 from the gasket 13 which permits air to pass into the bore 16c of the valve casing 16 through the orifice 16b in the side wall thereof through the orifice 1m in the casing 1 and upwardly through the bore 6c of the tube 6. As the air passes into the tube 5, a low pressure area is created about the hole 5b in the tube 5 and abrasive material is drawn from the bag 2 and the lower portion 1j of the casing 1 through said opening 5b and is carried upwardly in the forceful jet of air issued from the end 6a of the tube 6. As the abrasive and air leave the end 5c of the tube 5, the abrasive is impinged on the electrode end of the spark plug as indicated by dash lines A and the abrasive also is propelled upwardly into the spark plug around the porcelain thereof for efficiently and completely cleaning the spark plug. It will be herenoted that the resilient character of the grommet 17 permits various size spark plugs to be inserted through the opening 17b thereof and intimate contact of the spark plug A is maintained so that no leakage occurs therearound. During the operation of the jet of air and abrasive material upwardly of the shelf 1g in the casing 1 said abrasive and air is recirculated outwardly and downwardly of the spark plug as indicated by dash lines A and toward the bag 2 beyond the end of the shelf 1g. The curvature of the bag 2 promotes a smooth recirculation of the abrasive downwardly and into the opening 5b of the tube 5 for reuse. Thus, a small amount of abrasive is employed in the bag 2 which reduces the overall moisture gathering tendency of my spark plug cleaner. Such moisture is ordinarily gathered from the compressed air passing through spark plug cleaners and therefore the small amount of abrasive used in my spark plug cleaner being constantly recirculated is maintained in useful condition. After the abrasive action on the spark plug A is completed, and it is desired to remove any small particles of abrasive material remaining in connection with the plug A, the operator pivots the shaft 8 by means of the handle portion 8a toward the forward portion of the casing 1 which shifts the lever 9 in connection with the bearing portion 7b causing downward movement of the sleeve valve 7 around the tube 5 whereupon the lower end 7c of the sleeve valve 7 passes the opening 5b in the tube 5 preventing recirculation of abrasive through the tube 5. Thus, clean air is delivered from the tube 6 directly to the spark plug A efficiently removing any abrasive deposited therein or stuck around the porcelain internally of the plug. Thus, hazard to the internal combustion engine is reduced when the plug is reinstalled therein. After the air jet action on the plug A is completed, pressure is released from the front piece 11a of the button 11 whereupon the head portion 12a again engages the gasket 13 and shuts off the passage of air through the valve casing 16. It will be herenoted that during pressurization of air in the bore 16c of the valve 16, the spring 15 tending to close the plunger head 12a on the gasket 13 causes compression of the gasket 14 around the shank of the plunger 12 sealing the same and preventing escape of air to the atmosphere around said plunger 12. It will be herenoted that the externally screw threaded portion 16e of the valve casing 16 promotes the removal thereof which permits the entire replacement of the valve structure as a unit whereby simplicity of maintenance of my spark plug cleaner is attained.

The tubes 5 and 6 subject to wear by the abrasive may be readily removed from the casing 1 and replaced. The bags 2 may be readily replaced and all of these replacement parts together with the grommet 17 are relatively inexpensive and simple to install. Thus, my spark plug cleaner should produce a maximum amount of work over a long period of years with a minimum amount of maintenance expense.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a spark plug cleaner of the class described, the combination of a casing, an opening in the normally upper end of said casing in which a spark plug to be cleaned may be inserted, an air jet tube below said opening in axial alignment therewith, a second tube surrounding said air jet tube having an opening in the side wall thereof communicating with said air jet tube, said opening in said second tube near the lower portion at the interior of said casing, said second mentioned tube in concentric relationship with said air jet tube, said casing having an open side laterally of the axis of said first and second mentioned tubes and a bag of foraminous material surrounding said open side, a valve arranged to close said opening in said second mentioned tube for shutting off the passage of abrasive inwardly around said air jet tube.

2. In a spark plug cleaner of the class described, the combination of a casing, an opening in the normally upper end of said casing in which a spark plug to be cleaned may be inserted, an air jet tube below said opening in axial alignment therewith, a second tube surrounding said air jet tube having an opening in the side wall thereof communicating with said air jet tube, said opening in said second tube near the lower portion at the interior of said casing, said second mentioned tube in concentric relationship with said air jet tube, said casing having an open side laterally of the axis of said first and second mentioned tubes and a bag of foraminous material surrounding said opening, a valve arranged to close said opening in said second mentioned tube for shutting off the passage of abrasive inwardly around said air jet tube, said valve including a hollow cylindrical member vertically slidably mounted over said second mentioned tube arranged to cover said opening therein.

3. In a spark plug cleaner of the class described, the combination of a casing, an opening in the normally upper end of said casing in which a spark plug to be cleaned may be inserted, an air jet tube below said opening in axial alignment therewith, a second tube surrounding said air jet tube having an opening in the side wall thereof communicating with said air jet tube, said opening in said second tube near the lower portion at the interior of said casing, said second mentioned tube in concentric relationship with said air jet tube, said casing having an open side laterally of the axis of said first and second mentioned tubes and a bag of foraminous material surrounding said opening, a valve arranged to close said opening in said second mentioned tube for shutting off the passage of abrasive inwardly around said air jet tube, said valve including a hollow cylindrical member vertically slidably mounted over said second mentioned tube arranged to cover said opening therein, a shaft extending into said casing having an external handle portion and an internally disposed lever engageable with said valve for vertically reciprocally moving the same around said second mentioned tube.

4. In a spark plug cleaner of the class described, the combination of a casing, an opening in the normally upper end of said casing in which a spark plug to be cleaned may be inserted, an air jet tube below said opening in axial alignment therewith, a second tube surrounding said air jet tube having an opening in the side wall thereof communicating with said air jet tube, said opening in said second tube near the lower portion at the interior of said casing, said second mentioned tube in concentric relationship with said air jet tube, said casing having an open side laterally of the axis of said first and second mentioned tubes and a bag of foraminous material surrounding said opening, a valve arranged to close said opening in said second mentioned tube for shutting off the passage of abrasive inwardly around said air jet tube, said valve including a hollow cylindrical member vertically slidably mounted over said second mentioned tube arranged to cover said opening therein, a shaft extending into said casing having an external handle portion and an internally disposed lever engageable with said valve for vertically reciprocally moving the same around said second mentioned tube, a spring for maintaining said valve normally in open position.

5. In a spark plug cleaner of the class described, the combination of a casing, an opening in the normally upper end of said casing in which a spark plug to be cleaned may be inserted, an air jet tube below said opening in axial alignment therewith, a second tube surrounding said air jet tube having an opening in the side wall thereof communicating with said air jet tube, said opening in said second tube near the lower portion at the interior of said casing, said casing provided with a shelf portion near the upper end of said second mentioned tube in spaced relation to the normally upper end of said casing, said shelf contiguous to the periphery of said second tube a foraminous bag, having an inner concave surface extending from said shelf to said opening in the upper end of said casing.

6. In a spark plug cleaner of the class described, the combination of a casing having an opening therein in which a spark plug may be inserted, abrasive material in said casing, air jet means directed toward said opening, a valve intermediate said abrasive and said air jet means for shutting off said abrasive whereby said air jet may deliver clean air toward said opening in said casing for cleaning the remaining particles of abrasive material from a spark plug after said spark plug has been abraded.

HENRY H. MANCHESTER.

REFERENCES CITED

The following references are of record in the file of this patent:

UNITED STATES PATENTS

| Number | Name | Date |
|---|---|---|
| 1,399,225 | Pellet | Dec. 6, 1921 |
| 1,864,072 | Kleinfeld | June 21, 1932 |
| 1,930,115 | Vailes | Oct. 10, 1933 |
| 2,253,225 | Bowes et al. | Aug. 19, 1941 |
| 2,290,629 | Ake et al. | July 21, 1942 |

FOREIGN PATENTS

| Number | Country | Date |
|---|---|---|
| 114,175 | Australia | Oct. 31, 1931 |